(12) United States Patent
Buttfield-Addison

(10) Patent No.: US 11,763,044 B2
(45) Date of Patent: Sep. 19, 2023

(54) SYSTEMS AND METHODS FOR AUTOMATICALLY GROUPING DESIGN ELEMENTS

(71) Applicant: Canva Pty Ltd, Surry Hills (AU)

(72) Inventor: Mars Buttfield-Addison, Surry Hills (AU)

(73) Assignee: CANVA PTY LTD, Surry Hills (AU)

( * ) Notice: Subject to any disclaimer, the term of this patent is extended or adjusted under 35 U.S.C. 154(b) by 158 days.

(21) Appl. No.: 17/230,181

(22) Filed: Apr. 14, 2021

(65) Prior Publication Data

US 2021/0326497 A1 Oct. 21, 2021

(30) Foreign Application Priority Data

Apr. 15, 2020 (AU) ................. 2020901186

(51) Int. Cl.
*G06F 30/12* (2020.01)
*G06F 30/20* (2020.01)
*G06F 18/22* (2023.01)
*G06F 18/2431* (2023.01)
*G06F 18/2413* (2023.01)
*G06F 111/20* (2020.01)

(52) U.S. Cl.
CPC ............. *G06F 30/12* (2020.01); *G06F 18/22* (2023.01); *G06F 18/2431* (2023.01); *G06F 18/24137* (2023.01); *G06F 30/20* (2020.01); *G06F 2111/20* (2020.01)

(58) Field of Classification Search
CPC ...... G06F 30/20; G06F 30/00; G06F 2111/20; G06F 30/12; G06F 3/0481; G06F 3/0485; G06F 16/35; G06F 18/22; G06F 18/24137; G06F 18/2431; G06K 9/6215; G06K 9/6272; G06K 9/628; G06T 11/60
USPC .............................................. 703/2
See application file for complete search history.

(56) References Cited

U.S. PATENT DOCUMENTS

| | | |
|---|---|---|
| 2013/0080950 A1* | 3/2013 | Alford, Jr. .......... G06F 3/04817 715/765 |
| 2019/0073434 A1 | 3/2019 | Sathish et al. |
| 2019/0095557 A1* | 3/2019 | Sehgal ................. G06F 17/18 |
| 2020/0081691 A1 | 3/2020 | Gupta et al. |

OTHER PUBLICATIONS

Examination Report No. 1 for patent application No. AU2021202272 dated Mar. 30, 2022.
Lee H.-Y. et al., "Neural Design Network: Graphic Layout Generation with Constraints", arXiv preprint, Dec. 19, 2019. URL: https://arxiv.org/pdf/1912.09421v1.pdf.

* cited by examiner

*Primary Examiner* — Cedric Johnson
(74) *Attorney, Agent, or Firm* — GrowIP Law Group LLC

(57) ABSTRACT

Described herein is a computer implemented method for automatically grouping design elements on a page. The method comprises generating one or more sets of groups, each set of groups including one or more groups, each group grouping including one or more of the design elements; calculating set cohesion metrics for at least two of the sets of groups, the set cohesion metric calculated for a given set of groups providing a measure of how well the given set of groups has grouped the design elements on the page; determining, based on the cohesion metrics, a final set of groups; and grouping the design elements according to the one or more groups defined by the final set of groups.

16 Claims, 8 Drawing Sheets

SYSTEMS AND METHODS FOR AUTOMATICALLY GROUPING DESIGN ELEMENTS

CROSS-REFERENCE TO RELATED APPLICATION

This application is a U.S. Non-Provisional application that claims the benefit of the filing date of Australian Patent Application No. 2020901186, filed Apr. 15, 2020, which is hereby incorporated by reference in its entirety.

FIELD OF THE INVENTION

The present disclosure is directed to systems and methods for automatically grouping design elements.

BACKGROUND OF THE INVENTION

Various computer implemented tools for creating and publishing designs exist. One example is the tool provided by Canva Pty Ltd. Generally speaking, in order to create designs such tools allow users to add design elements to a page. Design elements may be accessed and added from one or more element libraries and/or drawn by using drawing tools.

Another feature offered by many design creation tools is the ability to group design elements together. Once two or more elements have been added to a group, the group itself can be manipulated as a single element.

Consider, for example a user who has added two elements to a page. If the user wishes to move both of those elements they can move both elements individually. Alternatively, the user can create a group including the two elements, in which case moving element A causes element B to also move (and vice versa).

Grouping elements can allow various operations to be more conveniently performed. For example, if a user wishes to make a same position change to 5 design elements, most design tools will enable this to be done by either individually moving each element (e.g. by dragging from an initial location to a new location) or by grouping the elements and moving the group as a whole.

In addition, the manner in which elements are grouped may impact how certain operations are performed. Two examples of such operations are page resizing (where a user changes the size of a page) and page re-aspecting (where a user changes the aspect ratio of a page). In both of these operations, the design tool will typically try to automatically adjust the sizes and/or positions of design elements to fit with the resized and/or re-aspected page. The manner in which elements are grouped can change the way elements are adjusted and, ultimately, impact on how successful or otherwise the automatic adjustment is.

Background information described in this specification is background information known to the inventors. Reference to this information as background information is not an acknowledgment or suggestion that this background information is prior art or is common general knowledge to a person of ordinary skill in the art.

SUMMARY OF THE INVENTION

Described herein is a computer implemented method for automatically grouping design elements on a page, the method comprising: receiving a request to automatically group the design elements; generating one or more sets of groups, each set of groups including one or more groups, each group grouping including one or more of the design elements; calculating set cohesion metrics for at least two of the sets of groups, the set cohesion metric calculated for a given set of groups providing a measure of how well the given set of groups has grouped the design elements on the page; determining, based on the set of cohesion metrics, a final set of groups; and grouping the design elements according to the one or more groups defined by the final set of groups.

Figure 1:
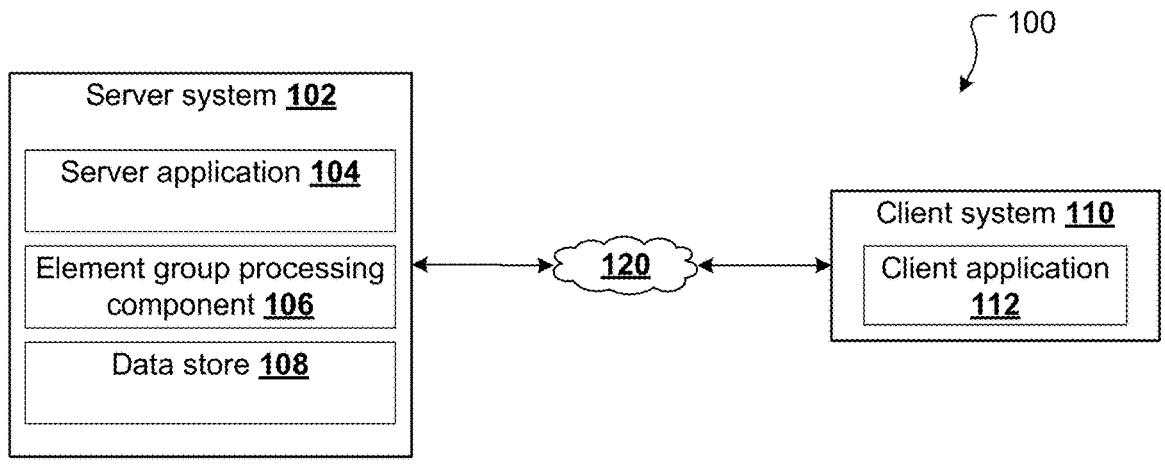
FIG. 1 is a block diagram illustrating an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many design tools provide functionality that allows design elements to be grouped together. Such grouping is typically performed by a user selecting elements and either: creating a new group that includes the selected elements; adding the selected elements to an existing group; or removing the selected elements from an existing group.

The present disclosure, however, is directed to systems and methods for processing design elements to automatically determine one or more potential groupings thereof.

Once potential element groupings have been determined, those groupings may be used for one or more specific purposes. For example, an automatically determined element group may be used during a page resizing and/or re-aspecting operation. As another example, one or more automatically determined element groups may be used to provide suggested element groupings to a user who can then confirm, reject, or adjust a given set of groups that has been suggested (and/or amend element membership of those groups). As a further example, an automatically determined element group may be used to provide responsive layouts that adapt to a user viewing the design on a device with a different page size and layout, and/or to discover repeated groups of similar sets of elements.

The embodiments described herein refer to design pages and elements.

A design page (page for short) defines an area that is intended to be viewed as a discrete whole. A page may also be referred to as a canvas. While a design tool may allow designs to create designs (e.g. documents) with multiple distinct pages, the present embodiments operate on an individual page basis.

A page will have certain page attributes, for example a page identifier (typically assigned by the design tool and unique at least for the design in question), a page width, and a page height. The width and height of a page define both its size and aspect ratio.

A page has an associated coordinate system (typically a common coordinate system provided by the design tool for all pages). By way of example, the page coordinate system may be a Cartesian coordinate system defining a horizontal (x) axis and vertical (y) axis.

The units of the coordinate system can be any appropriate units, for example pixels, millimetres, centimetres, inches, or an alternative unit.

The origin of the coordinate system (x=0, y=0), and direction in which x and y increase/decrease, may be defined as desired. In the present embodiments, the origin (x=0, y=0) for a page is defined as the top left corner of the page, with x-axis coordinates increasing from left to right and y-axis coordinates increasing from top to bottom.

In the embodiments described herein, a page (e.g. the page identifier) is associated with a list of elements. A page's element list is used to record all elements that have been added to the page—e.g. a list of element identifiers.

Design elements (elements for short) are objects that are added to a page. Elements may be copied or imported from one or more element libraries (e.g. libraries of images, animations, videos, etc.). Alternatively, elements may be drawn or created using one or more design tools, for example a text tool, a line tool, a rectangle tool, an ellipse tool, a curve tool, a freehand tool, and/or other design tools or combinations thereof.

Once an element is added to a page it is given an element identifier (typically automatically assigned by the design tool). The element identifier is unique at least within the page that the element has been added to. A given design element has associated element attributes. The particular element attributes that are or can be associated with a given element may depend on the type of element in question. By way of example, however, element attributes may include those shown in the table below:

| Element attribute | Description |
| --- | --- |
| Element identifier | Identifier for the element (unique at least within the page the element has been added to). |
| Element origin | For example, x and y coordinates defining an origin point of the element. |
| Element width | A value defining the width of the element. |
| Element height | A value defining the height of the element. |
| Element rotation | A value defining a degree of rotation of the element, e.g. a value x such that −180 degrees <= x <= +180 degrees. |
| x-flipped data | For example a Boolean indicating whether the element has been flipped in the x dimension. |
| y-flipped data | For example a Boolean indicating whether the element has been flipped in the y dimension. |
| Element fill | Data defining a fill of a rectangular element - for example a colour or an identifier of a library element image, video, or other media file used to fill the element. |
| Element transparency | Data defining any transparency applied to the element. |
| Parent element | Identifier of an element (i.e. a group) that the present element is a child (i.e. member) of. Empty/null if the element is not a member of a group. |
| Child element(s) | A list of identifiers of all elements that are children of the present element (i.e. the group of elements this element represents). Empty/null if the element has no children (i.e. where the element does not represent a group). |

Additional (and/or alternative) element attributes are possible.

The design tool may define the origin point for elements to be any defined (consistent) point. In the embodiments described herein, the origin point is defined as the top left corner of an element—i.e. x=the leftmost x coordinate of the element and y=the topmost y coordinate of the element. Alternative element origin points may however be used— e.g. any other corner of the element, a centre point of the element, or any other defined origin point.

Element x/y coordinates and widths/heights are typically in the units of the coordinate system for the page the element is positioned on.

Any appropriate value may be used for rotation (e.g. degrees or radians). Rotation may be about a predefined constant pivot point (e.g. a centre point of the element (e.g.

(((origin x coordinate+width)/2), ((origin y coordinate+height)/2)), the origin, a corner of the element, or an alternative predefined constant pivot point. Alternatively, rotation may be about a pivot point that is defined for each individual element, either by a user or automatically (e.g. a pair of pivot coordinates (pivot x, pivot y)).

As discussed below, an element may be member of an explicitly defined (i.e. user defined) group of elements. In this case, and in the present examples, the element origin, rotation, x-flipped data, and y-flipped data are relative to the group the element is a member of. This is discussed further below. If an element is not a member of a group, these attributes are with respect to the page as a whole.

As noted above, a given page has a list of elements that defines the elements that have been added to that page.

When an element is added to the page the element (or element identifier) is added to the page's element list. Absent explicit user manipulation, elements are added to the page's element list in the order they are added to the page. In some implementations, the first item in the page's element list (i.e. list index 0) will be a background element. In this case, the first element added to the page by a user becomes the second item in the page's element list (index 1 of the list), the next element added becomes the third item in the page's element list (index 2 of the list) and so forth.

Constructing a page's element list in this manner means that an element's position (index) in the element list also defines its depth or z-index in the page: i.e. an element at index n is behind an element at index n+1 and in front of an element at index n−1. Where a given element is in front of one or more other elements it can, depending on position/size/rotation/transparency, occlude or partially occlude any/all elements it is in front of. I.e. an element at index n is in front of all elements with an index of <n.

Design tools typically provide mechanisms for a user to manually adjust an element's depth, for example by bringing forward, sending backwards, bringing to front, sending to back. If such adjustments are made, corresponding changes are made to the order of the page's element list.

Design tools also typically provide mechanisms for user's to group elements together. For example, a user may select multiple elements and create a new group for those elements, or select one or more elements and add them to an existing group.

Element groups can be handled in various ways. In the present example, an element group is itself recorded as an element having (as described for the element attributes above) an element identifier; element origin; element rotation; x-flipped data; y-flipped data.

In addition, an element that represents a group has a child element(s) attribute which stores a list of elements that belong to the group the element is representing.

To illustrate, consider creation of a new group to which elements E001 and E002 are added to. In this case, the design tool: creates a new element for the group; provides the new element with an element identifier—for example G001; calculates/records the group's origin, width and height based on the corresponding attributes of the group's member elements (in this example E001 and E002) (described below); records other relevant attributes (e.g. rotation, initialised to 0 degrees, x/y-flipped initialised to false); records the list of element identifiers [E001, E002] as the child element(s) attribute for the new group element; and amends elements E001 and E002 to record element identifier G001 as the parent element attribute for these elements.

In this example, new group element G001 is newly created and is not itself a member of a group. Accordingly, the parent element attribute for G001 is left empty/provided with a value indicating G001 has no parent (and therefore is not part of a group). If, at a later time, element G001 is added to a group, the parent element attribute for G001 will be populated with the appropriate element identifier for the group it is added to.

As will be appreciated, providing both parent element and child element(s) attributes introduces redundancy: i.e. group membership could be accurately recorded using one or the other (rather than both) of these attributes. Providing both attributes, however, makes certain operations with respect to groups more efficient. For example, if only the parent element attribute was provided, determining all members of a particular group (e.g. G001) would require all elements to be analysed in order to identify those with the relevant element identifier stored in the parent element attribute (i.e. G001). By providing a child element(s) attribute, however, determining the children (members) of a given group (e.g. defined by element G001) requires analysis of a single element (G001).

Conversely, if only the child element(s) attribute was provided, determining whether a given element (e.g. element E001) is a member of a group or not would require all elements to be analysed in order to identify whether that element is included in an element's child element(s) attribute. By providing a parent elements attribute, however, determining whether an element is a member of a group (and, if so, the identifier of that group) only requires analysis of the element in question.

As noted above, where an element is a member of a group, a number of element attributes are relative to the group that the element belongs to. Consider, for example, an element with identifier E001 that has element origin x/y coordinates of (10, 20), a rotation of 90 degrees, and belongs to a group element (e.g. has a parent element identifier) G001. In the present implementation this means that the top left corner of element E001 is at x=10 and y=20 taken from the origin point of group element G001 (not the origin of the page as a whole), and that element E001 is rotated 90 degrees within group element G001 (not the page as a whole).

If group element G001 has origin x/y coordinates of (0, 0) and a rotation of 0 degrees (and group G001 is not itself a member of another group), the ultimate position of element E001 on the page will be (10, 20) and the ultimate rotation of element E001 on the page will be 90 degrees.

Conversely, if group element G001 has origin x/y coordinates of (50, 70) and a rotation of 60 degrees, the ultimate position of element E001 on the page will be (60, 90) (i.e. ((group origin x+element origin x), (group origin y+element origin y)) and the ultimate rotation of element E001 on the page will be 150 degrees (i.e. group rotation+element rotation).

Where an element represents a group, its origin, width and height are calculated based on the attributes of its constituent members. Example calculations (with the coordinate system described above in mind) are as follows.

The (x, y) origin of a group is calculated as ((minimum or equal minimum x coordinate of all elements in the group), (minimum or equal minimum y coordinate of all elements in the group)).

The width of a group is calculated as: (maximum/equal maximum x value of the group's elements)−(minimum/equal minimum x value of the group's elements).

The maximum x value of a group's elements can be calculated by calculating maximum x-coordinates for all elements in the group and selecting the maximum/equal maximum x-coordinate. Calculating the maximum x-coordinate for a given element is done by adding the element's width to its x origin.

The minimum x-value of a group's elements will, in this example, be the x origin of the group as described above.

The height of a group can calculated in the same manner as the width (however working on the y axis rather than x axis)—e.g. (maximum/equal maximum y value of the group's elements)–(minimum/equal minimum y value of the group's elements).

As noted, the present disclosure is concerned with automatically creating element groups. For clarity, therefore, any manually created element groups (which may include automatically created element groups that a user has explicitly accepted) will be referred to as explicit groups. In some implementations, a design tool may allow a single level of explicit groups (i.e. such that an explicit group of elements cannot itself be added to a further explicit group of elements). Other implementations may allow for explicit element groups to be added to further explicit groups.

FIG. 1 depicts one example of a networked environment 100 in which the various operations and techniques described herein can be performed.

Networked environment 100 includes a design server system 102 and a client system 110 that are interconnected via a communications network 120 (e.g. the Internet). While a single client system 110 is illustrated and described, server system 102 will typically serve multiple client systems.

The Design server system 102 includes various functional components which operate together to provide server side functionality.

One component of server system 102 is a front-end server application 104. The server application 104 is executed by a computer processing system to configure that system to provide server-side functionality to one or more corresponding client applications (e.g. client application 112 described below). The server-side functionality includes operations such as user account management, login, and design specific functions—for example creating, saving, publishing, sharing designs.

To provide the server-side functionality, the server application 104 comprises one or more application programs, libraries, APIs or other software elements. For example, where the client application 112 is a web browser, the server application 104 will be a web server such as Apache, IIS, nginx, GWS, or an alternative web server. Where the client application 112 is a specific application, the server application 104 will be an application server configured specifically to interact with that client application 112. Server system 102 may be provided with both web server and application server modules.

In the present example, server system 102 also includes an element group processing component 106 (EGP 106 for short). As described below, the element group processing component 106 performs (or configures the server application 104 to perform) processing to automatically group (or suggest groupings for) design elements. EGP 106 may be software module such as an add-on or plug-in that operates in conjunction with the server application 104 to expand the functionality thereof. In alternative embodiments, however, the functionality provided by the EGP 106 may be natively provided by the server application 104 (i.e. the server application 104 itself has instructions and data which, when executed, cause the server application 104 to perform part or all of the element grouping functionality described herein).

In the present example, server system 102 also includes a data store 108 which is used to store various data required by the server system 102 in the course of its operations. Such data may include, for example, user account data, design template data, design element data, and data in respect of designs that have been created by users. While one data store 108 is depicted server system 102 may include/make use of multiple separate data stores—e.g. a user data store (storing user account details), one or more element library data stores (storing elements that users can add to designs being created); a template data store (storing templates that users can use to create designs); a design data store (storing data in respect of designs that have been created); and/or other data stores.

In order to provide server side functionality to clients, server system 102 will typically include additional functional components to those illustrated and described. As one example, server system 102 will typically include one or more firewalls (and/or other network security components) and load balancers (for managing access to the server application 104).

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, server application 104 and EGP 106 may run on a single dedicated server computer and data store 108 may run on a separate server computer (with access to appropriate data storage resources). As an alternative example, server system 102 may be a cloud computing system and configured to commission/decommission resources based on user demand 104. In this case there may be multiple server computers (nodes) running multiple server applications 104 which service clients via a load balancer.

Client system 110 hosts a client application 112 which, when executed by the client system 110, configure s the client system 110 to provide client-side functionality for/ interact with the server application 104 of the server system 102. Via the client application 112 can interact with the server application 104 in order to perform various operations such as creating, editing, saving, retrieving/accessing, publishing, and sharing designs.

Client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

Client system 110 may be any computer processing system which is configured (or configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application such as a Microsoft Windows operating system, an Apple macOS operating system, an Apple iOS operating system, an Android operating system, a Unix or Linux operating system, or an alternative operating system.

The architecture described above and illustrated in FIG. 1 is provided by way of example only, and variations are possible.

For example, while the EGP 106 has been described and illustrated as being part of/installed at the server system 102, the functionality provided by the EGP 106 could alternatively (or additionally) be provided by a client system 110 (for example as an add-on or extension to client application 112, a separate, stand-alone application that communicates with client application 112, or a native part of client application 112).

As a further example, the EGP 106 could be provided as an entirely separate service—e.g. running on a separate server system to server system 102 and communicating with client application 112 (and/or server system 102) as required to perform the element grouping functionality described herein.

As yet a further example, the design tool described herein may be a self-contained application that is installed and runs solely on a client system without any need of a server application.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
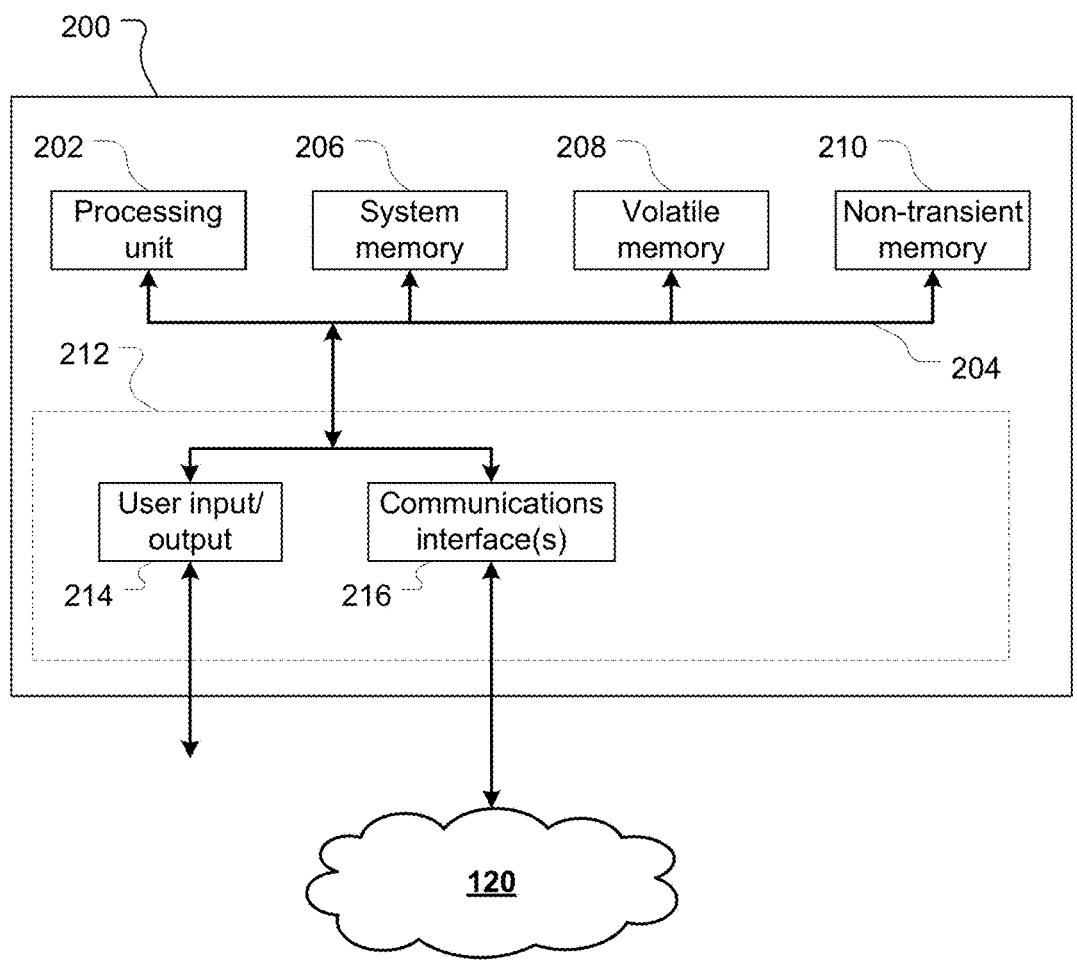
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-transient storage medium 210 (e.g. one or more hard disk, solid state drives, or other non-transient memory devices).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices 214 to allow data to be input into/received by system 200 for processing by the processing unit 202, and one or more output devices 214 to allow data to be output by system 200. Example devices 214 are described below, however it will be appreciated that not all computer processing systems will include all mentioned devices, and that additional and alternative devices to those mentioned may well be used.

For example, system 200 may include or connect to one or more input devices 214 by which information/data is input into (received by) system 200. Such input devices 214 may include keyboards, mice, trackpads, microphones, accelerometers, proximity sensors, GPS devices and the like. System 200 may also include or connect to one or more output devices 214 controlled by system 200 to output information. Such output devices 214 may include devices such as a CRT displays, LCD displays, LED displays, plasma displays, touch screen displays, speakers, vibration modules, LEDs/other lights, and such like. System 200 may also include or connect to devices which may act as both input and output devices 214, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 180 of environment 100 (and/or a local network within the server system 102 or OS 120). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows, Apple macOS, Apple iOS, Android, Unix, or Linux.

System 200 also stores or has access to applications which, when executed by the processing unit 202, configure system 200 to perform various computer-implemented processing operations described herein. For example, and referring to the networked environment of FIG. 1 above: client system 110 includes a client application 112 which configures the client system 110 to perform the operations described herein.

In some cases, part or all of a given computer-implemented method will be performed by system 200 itself, while in other cases processing may be performed by other devices in data communication with system 200.

As described above, the present disclosure is generally concerned with automatically grouping (or suggesting groupings for) design elements. The particular manner in which a design is created is not of specific relevance to this disclosure, however in order to provide context this section provides a simple example of a design creation user interface and the creation of a design.

Figure 3:
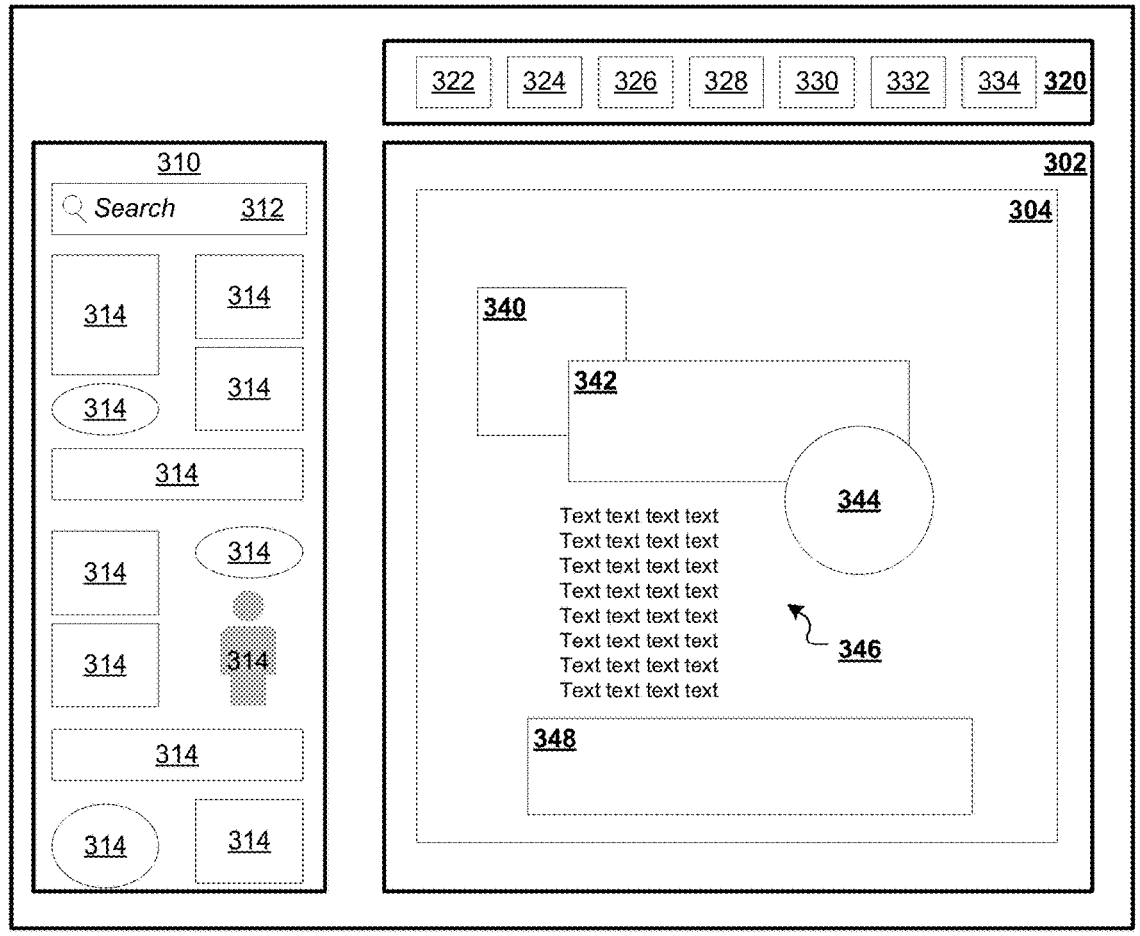
FIG. 3 provides an example of a design creation user interface.

FIG. 3 provides a depiction of a design creation user interface 300 which is displayed by a client system 102 (the client system 102 configured to do so by client application 104).

Via interface 300 a user can create a design document that comprises one or more pages and (inter alia) add elements to the page. Example design creation interface 300 includes a design creation pane 302 in which the design currently being worked on is displayed. In the present example, design creation pane 302 shows a single page 304 of a design document.

Design creation interface 300 also includes a design element search and selection pane 310 via which a user can search or browse one or more design element libraries, view design element previews 314, and select design elements to be included in the design document. To this end, pane 310 includes a search box 312 (allowing in this case a user to enter search text) and design element previews 314 providing preview images of design elements. Design elements previewed in the search and selection pane 310 can be added to the design being worked on (e.g. to page 304), for example by dragging and dropping, double-clicking, dwelling, or any other appropriate user interaction.

Design creation interface 300 also includes a toolbar 320 providing various tools for design creation and editing. In this particular example the tools include: an element selection tool 322 allowing a user to select a particular design element that has been added to the page 304; a drawing tool 324 allowing a user to draw a design element having a geometric or other shape; a text tool 326 allowing a user to add a textual design element; a colour tool 328 allowing a user to manually adjust one or more colours of a given design element; an import tool 330 allowing a user to import an element from another source (e.g. an element stored on locally or remotely accessible memory, an element from a third party server, etc.); a create explicit group tool 332 (allowing a user to explicitly create a group).

While not shown, toolbar 320 will typically be an adaptive toolbar in that the tools provided change depending on what the user is doing. For example, if a user selects the text tool 326 additional (or alternative) tools relevant to text may be displayed: e.g. a font selection tool and a text size tool.

In the present example, toolbar 320 also includes an automatically group elements control 334, activation of which triggers an automatic element grouping process as described below.

Generally speaking, in order to create a design a user creates a page and adds design elements to that page. Design elements can be added in various ways. For example, a user can interact with the design element search and selection pane 310 to search/browse for design elements and then add elements to the design being created —e.g. by selecting a design element preview 314, dragging it to a position on the page 304, and dropping it. Alternatively, a user may create and add an entirely new element—e.g. by drawing an element using a tool such as drawing tool 324 or adding custom text via text tool 326. Further alternatively, a user may import an element via import tool 330.

In this specific example, page 304 includes five design elements: 340, 342, 344, 346, and 348.

Once an element has been added to the page it is added to the page's element list and the user can interact further with it—e.g. by adjusting its position, size (height and/or width), changing its depth with respect to other design elements on the page 304 (e.g. bringing forward, moving backward, bringing to front, moving to back), moving it to another page of the design document, changing its rotation, flipping it about an axis, adjusting colours, deleting it, duplicating it, adding it to a group, removing it from a group, etc.

Interface 300 is provided by way of example only, and alternative design creation interfaces (with alternative user interface elements and controls) are possible.

This following describes processing involved in order to automatically determine element groups.

Certain operations are described as being performed by the element group processing component (EGP) 106. As noted above, EGP 106 may be installed on a server system 102 or client system 110. Alternatively, the functionality provided by the EGP processing component 106 may be provided by a server application (such as server application 104 running on a server system 102), a client application (such as client application 112 running on a client system 110), or by a combination of applications running on the same or different systems.

Figure 4:
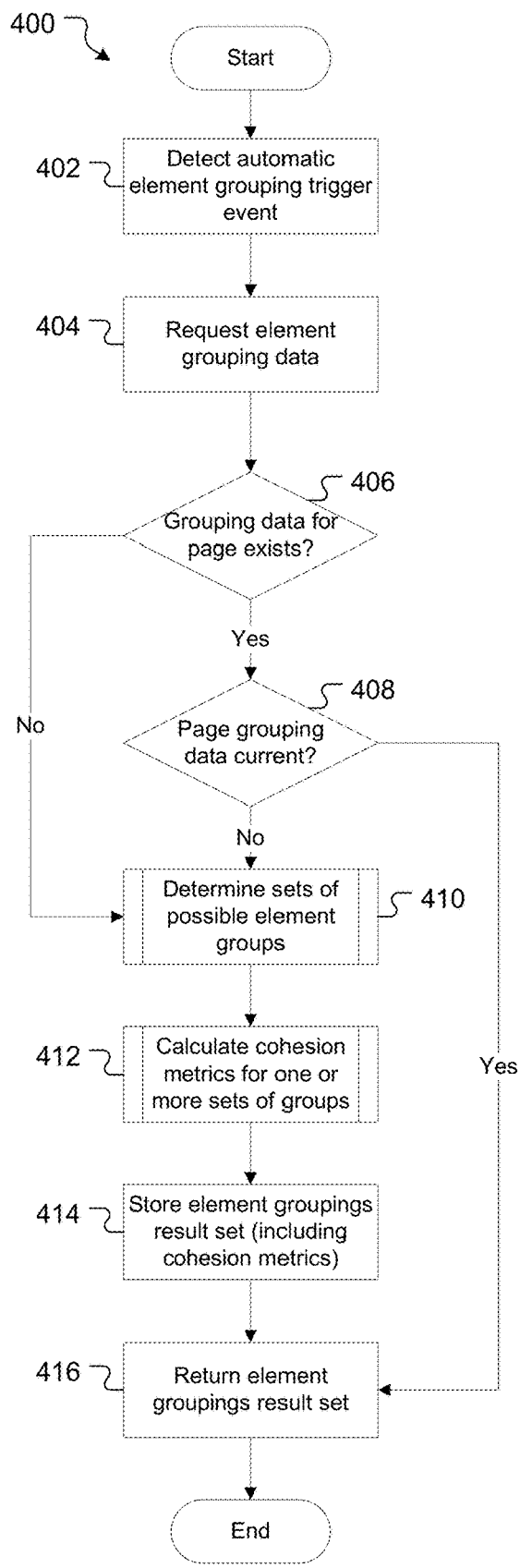
FIG. 4 is a flowchart depicting operations involved in an automatic element grouping process.

FIG. 4 is a flowchart depicting operations involved in an automatic element grouping process 400.

At 402, an automatic element grouping trigger event is detected.

In client-server architectures where the EGP 106 runs on the server system 102 (as described above with reference to FIG. 1), a trigger event may be detected by the client application 112 or the server application 104. If detected by the client application 112 detection of the trigger event causes the client application 112 to notify the server application 104 of the trigger event.

In stand-alone implementations (e.g. where all processing is performed by a single computer, such as client system 110) the trigger event is detected by the client application.

Various automatic element grouping trigger events are possible.

For example, receiving user input at client system 110 that activates a specific user interface control (e.g. an 'auto group elements' control 334 as described above) may be a grouping trigger event.

Automatic grouping trigger events may additionally, or alternatively, be automatically occurring events. For example, the client application 112 and/or server application 104 may be configured to such that automatic grouping is triggered when: a grouping-relevant page change is made; a grouping-relevant-element change is made; at defined and/or regular time intervals; and/or on any other appropriate event.

A grouping relevant page change may include: resizing a design page; re-aspecting a design page; saving a design page; adding a defined number (one or more) of new elements to a design page; deleting a defined number (one or more) existing elements from a design page.

A grouping-relevant change to an element may be any change made to an element that could impact the automatic grouping process. By way of example, grouping-relevant changes may include one or more of a page element being: moved (i.e. an origin change); resized (a change in width/height), rotated (a change in rotation value); added to an explicit group; removed from an explicit group; x-flipped or y-flipped (unless x/y flipping are about central x/y axes and do not change an elements origin, height and position).

In certain implementations, different trigger events may be associated with different trigger event types—for example a re-aspecting trigger event or a re-sizing trigger event.

At 404, a request is made to the EGP 106 to provide element grouping data. This request may be made by the server application 104 or client application 112.

At 406, the EGP 106 determines if element grouping data for the page in question exists. This determination may be made, for example, using a page identifier for the page in question and determining whether element grouping data for that page is stored in memory (e.g. in data store 108, local memory of client system 110, or other accessible memory where element grouping data is stored).

If, at 406, element grouping data for the page does exist, processing continues to 408. If not, processing continues to 410.

At 408, the EGP 106 determines whether the element grouping data that exists for the page is current. This may be performed in various ways. For example the EGP 106 may compare a timestamp indicating when the existing element grouping data was generated with a timestamp indicating when the last grouping-relevant change (as described above) was made to an element on the page in question.

Alternatively, the EGP 106 may compare the element data that was used to generate the existing grouping data against the current element data for the page to determine if any relevant changes have been made. This too can be performed in various ways, for example by calculating a hash of the current element data for the page (or relevant attributes of the page's elements) and comparing it to a hash of the element data that was used to generate the existing element grouping data: if the hashes match the existing grouping data is current, if not it isn't.

In either case, if no relevant changes have been made since the last time element grouping data was generated, the EGP 106 will determine that the existing element grouping data for the page is current. In this case processing continues to 416 (where the current element grouping data for the page in question or a pointer/link thereto is returned).

If relevant changes have been made since the last time element grouping data was generated, the EGP 106 will determine that the existing element grouping data for the page is not current. In this case, processing continues to 410.

At 410, the EGP 106 determines sets of possible element groups. This process is described below with reference to FIG. 5, and generates an element groupings result set.

In the embodiments herein, an element groupings result set defines multiple (alternative) sets of element groups for the page elements. Various data structures could be used for the element groupings result set. The data structure used by the embodiments described herein, however, is a map (associative array) having the following format:

```
{
    Element001: [0, 0, 0, 0],
    Element002: [0, 0, 0, 3],
    Element003: [0, 1, 2, 2],
    Element004: [0, 1, 1, 1]
}
```

In this format, a key/value pair is provided for each element of the page that is involved in the grouping process (which, as discussed below, is each element that is not a member of an explicit group).

The key of each key value pair is an identifier of the element that the key/value pair relates to (e.g. the element identifier for that element).

The value of each key value pair is an array. Each array value indicates a group that the element in question has been assigned to in a particular set of groups. I.e. the first values of the element's arrays (array index=0) indicate a first potential set of groups, the second values of the arrays (array index=1) indicate a second potential set of groups, the nth values of the arrays (array index=n−1) indicate an nth potential set of groups. The actual value of a particular array element indicates which group the element belongs to in that potential set of groups.

In one implementation, elements can only share a group identifier at index i if they share a group identifier at index i−1. In other implementations, however, no such constraint is required/implemented.

Accordingly, in the example element groupings result set above: in the first potential set of groups (array index 0), all elements are in a single group (group 0); in the second potential set of groups (array index 1), elements 001 and 002 are in group 0 and elements 003 and 004 are in group 1; in a the third potential set of groups (array index 2), elements 001 and 002 are in group 0, element 003 is in group 2, and element 004 is in group 1; and in the fourth potential set of groups (array index 3) element 001 is in group 0, element 002 is in group 3, element 003 is in group 2, and element 004 is in group 1.

At 412, the EGP 106 calculates set cohesion metrics for one or more of the sets of groups defined by the element groupings result set. Generally speaking, the set cohesion metric for a given set of groups provides a measure of how well the given set of groups has grouped the design elements on the page.

In certain implementations, the EGP 106 is configured to calculate set cohesion metrics for all sets of groups defined by the element groupings result set.

In alternative implementations, in order to reduce processing the EGP 106 is configured to calculate set cohesion metrics for only some of the sets of groups defined by the element groupings result set.

For example, the EGP 106 may be configured to only calculate set cohesion metrics for the sets defined by array elements from (number of elements*0.25) to (number of elements*0.75). This will result in set cohesion metrics not being calculated for sets appearing at/near the start of the result set arrays (which will be sets in which the elements are either in a single group or divided between a relatively low number of groups) or for sets appearing at/near the end of the result set arrays (which will be sets in which every element is in its own group or the elements are divided between a relatively high number of groups).

By way of example, however, consider the following result set generated at 410:

```
{
    Element001: [0, 0, 0, 0],
    Element002: [0, 0, 0, 3],
    Element003: [0, 1, 2, 2],
    Element004: [0, 1, 1, 1]
}
```

If calculating set cohesion metrics for all of these sets of groups, the EGP 106 would calculate:
Test(K=1 group)=cohesion of [[001, 002, 003, 004]]
Test(K=2 groups)=cohesion of [[001, 002], [003, 004]]
Test(K=3 groups)=cohesion of [[001, 002], [004], [003]]
Test(K=4 groups)=cohesion of [[001], [002], [003], [004]]

Various set cohesion metrics (and methods of calculating set cohesion metrics) can be used. In the present embodiments, the set cohesion metric for a given set of groupings 'G' (the set of groupings G having one or more groups g) is calculated according to the following formula:

(total coherence over groups 'g')/(square root of the number of groups in 'G')*(10 to the power of the number of groups in 'G').

Calculation of the total coherence over a group G's groups is, effectively, calculating the group cohesion metric for those elements. Calculation of a group cohesion metric is described below with reference to FIGS. 7 and 8.

In this example calculation, the lower the set cohesion metric the more cohesive the set of groups—i.e. the set of groups G with the minimum score is determined the most cohesive.

Set cohesion metrics may be stored in an array of cohesion values, each element of the array corresponding to a set of groups in the element groupings result set. An example array of set cohesion metrics corresponding to the above element groupings result set may be:

[null, x, y, null]

In this example, element 0 of the set cohesion metric array corresponds to the first set of groups in the element groupings result set (as defined by element 0 of the arrays in the element groupings result set). The null value indicates a set cohesion metric has not been calculated for this set of groups (this is discussed below).

Element 1 of the set cohesion metric array corresponds to the second set of groups in the element groupings result set (for example, taking the above result set, the set of groups in which elements 0 and 1 are in one group (group 0) and elements 2 and 3 are in a second group (group 1). It has an actual cohesion value (x).

Element 3 of the set cohesion metric array corresponds to the third set of groups in the element groupings result set. It has an actual cohesion value (y).

Element 4 of the set cohesion metric array corresponds to the fourth set of groups in the element groupings result set. Its value is null.

More generally, element n of the set cohesion metric array (index n−1) corresponds to the nth set of groups defined by the element groupings result set (i.e. index n−1 of the element arrays of the element groupings result set).

At 414, the EGP 106 stores the element grouping data 106. In some implementations all element grouping data will be stored (i.e. all sets of groups determined at 410 along with cohesion metrics calculated at 412). In alternative implementations only some (or one) of the sets of groups determined at 410 are stored, along with the associated set cohesion metric(s). In addition, the element grouping data may be stored with a timestamp, a hash of the element data used to generate the element grouping data, and/or other data allowing the currency of the element grouping data to be checked.

In alternative embodiments, instead of (or in addition to) being stored by the EGP 106, the element grouping data is stored by the application that requested the grouping data (e.g. the server application 104 or client application 112).

At 416, the EGP 106 returns grouping data.

In certain embodiments (or for certain types of trigger events) the EGP 106 may return the entire element groupings result set generated at 410 (together with set cohesion metrics calculated at 412).

In alternative embodiments (or for certain types of trigger events) the EGP 106 may return a single set of groups—e.g. the set of groups from the element groupings result set with a set cohesion metric indicating the set of groups has the highest cohesion.

In still further embodiments (or for certain types of trigger events), the EGP 106 may return a defined number of sets of groups from the element groupings result set (together with set cohesion metrics for those sets of groups). For example, a user may request n options to consider, in which case the EGP 106 will return the n sets of groups with the highest cohesion. Alternatively, the EGP 106 may be configured to return any sets that have a cohesion metric that meets a defined set cohesion threshold (or, if no sets meet the threshold, return no sets with a message that automatic grouping could not be performed). Further alternatively, the EGP 106 may be configured to return up to x sets based on their set cohesion metrics.

In yet another the EPG 106 observes relevant change events for page elements and re-calculates full or partial groupings and cohesion metrics so that they are available when requested (e.g. at 404).

Following 416, the design tool performs operations using the returned grouping data to perform one or more operations. The grouping data can be used to perform various operations.

For example, the design tool may use the grouping data to cause the client application 112 to visually indicate one or more groups of elements defined by a given set of groups. Via an appropriate UI element the user can then accept one or more of the element groups displayed (in which case the element groups are recorded as explicit element groups) or reject the element groups displayed (in which case an alternative set of element groups may be displayed to the user to accept or reject). If a user accepts one or more groups of elements (thereby making them explicit groups) element grouping may be recalculated taking the new explicit group(s) into account.

As another example, the design tool may use the groups defined by a given set of element groups to determine how elements on the page should be treated during a page resize operation.

As another example, the design tool may use the groups defined by a given set of element groups to determine how elements on the page should be treated during a page re-aspect operation.

As a further example, automatically determined groups could be used to assist users in selecting groups of elements. For example, if a user selects a particular element (either in general operation or in a particular group selection mode) a group selection bounding box may automatically be displayed/snap to the group of elements that element has been calculated to belong to. Once again, a user can then accept, reject, or adjust the group.

Figure 5:
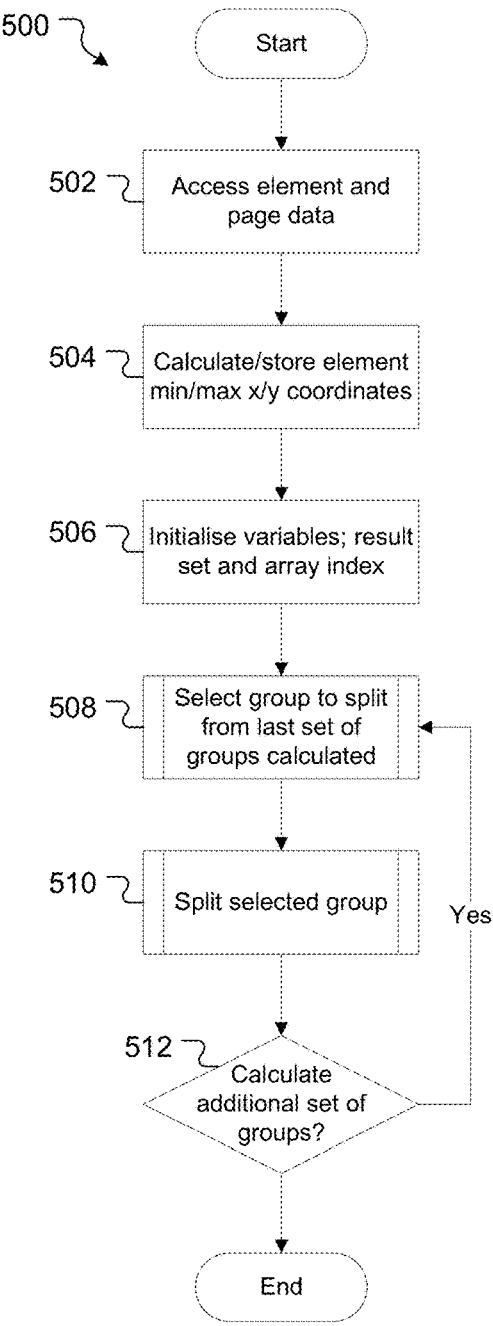
FIG. 5 is a flowchart depicting operations involved in determining sets of possible element groups.

Turning to FIG. 5, an example process 500 for determining possible sets of element groups (per 410 above) will be described.

At 502, the EGP 106 accesses element and page data required to perform the automatic group processing. The page data includes the height and width of the page. In the present embodiments, the element data used by the EGP 106 includes, for each page element that is not a member of a group, the following attributes:

| Element attribute | Example value |
|---|---|
| Identifier | E001 |
| Origin | (50, 60) |
| Width | 100 |
| Height | 30 |
| Rotation | 15 |

In the present embodiments, automatic grouping is performed on each element that is not a member of an explicit group. Elements that are members of an explicit group are not directly processed, but are treated the same as their ultimate parent group.

Where a hash is used to determine whether element grouping data is current or not, the hash may be calculated on the page data and sets of element attributes accessed at 502.

At 504, the EGP 106 calculates and stores (at least temporarily, for downstream use in automatic grouping processes) min x, max x, min y and max y values for each element accessed at 502. Where an element has no rotation (or a rotation θ of 0 degrees):

min $x$ = $x$ coordinate of the element's origin max $x$ = min $x$ + the element's width min $y$ = $y$ coordinate of the element's origin max $y$ = min $y$ + the element's height.

Where an element has a rotation θ of other than 0, the min x, max x, min y and max y values are calculated to take the rotation into account. This calculation can be performed in various ways and will depend on the rotation units (degrees or radians) and the pivot point about which an element is rotated.

At 506, the EGP 106 initialises variables required for the automatic grouping process. This includes initialising an element groupings result set that is populated with potential sets of groups over the process.

In the present disclosure, using the element groupings result set format described above, the initialised result set includes a key value pair for every element accessed at 502 (i.e. every element that is not a member of an explicit group), the value of each key value pair being an array with a single element that is set to the same value (e.g. 0). The single common-value elements of the arrays indicates a set of groups in which all elements are in the same group. E.g.:

```
{
    Element001: [0],
    Element002: [0],
    ...
    Element00n: [0]
}
```

At 508, the EGP 106 selects a target group of elements to split from the last set of groups calculated. The last set of groups calculated will be the set of groups defined by the current final elements of the result set arrays.

Figure 6:
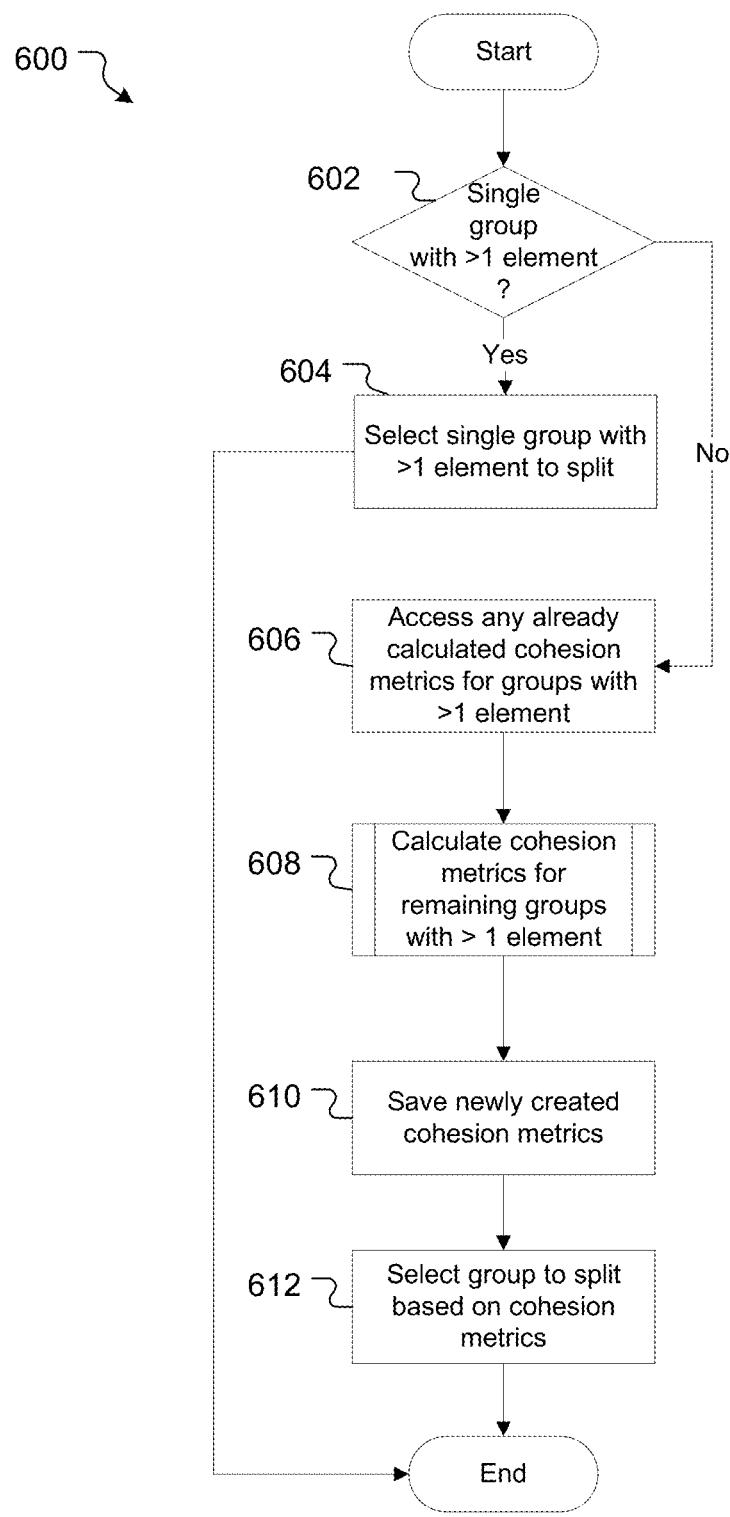
FIG. 6 is a flowchart depicting operations involved in determining a group from a set of possible groups to split.

Example processing for determining a group to split from a set of groups is described below with reference to FIG. 6.

Figure 9:
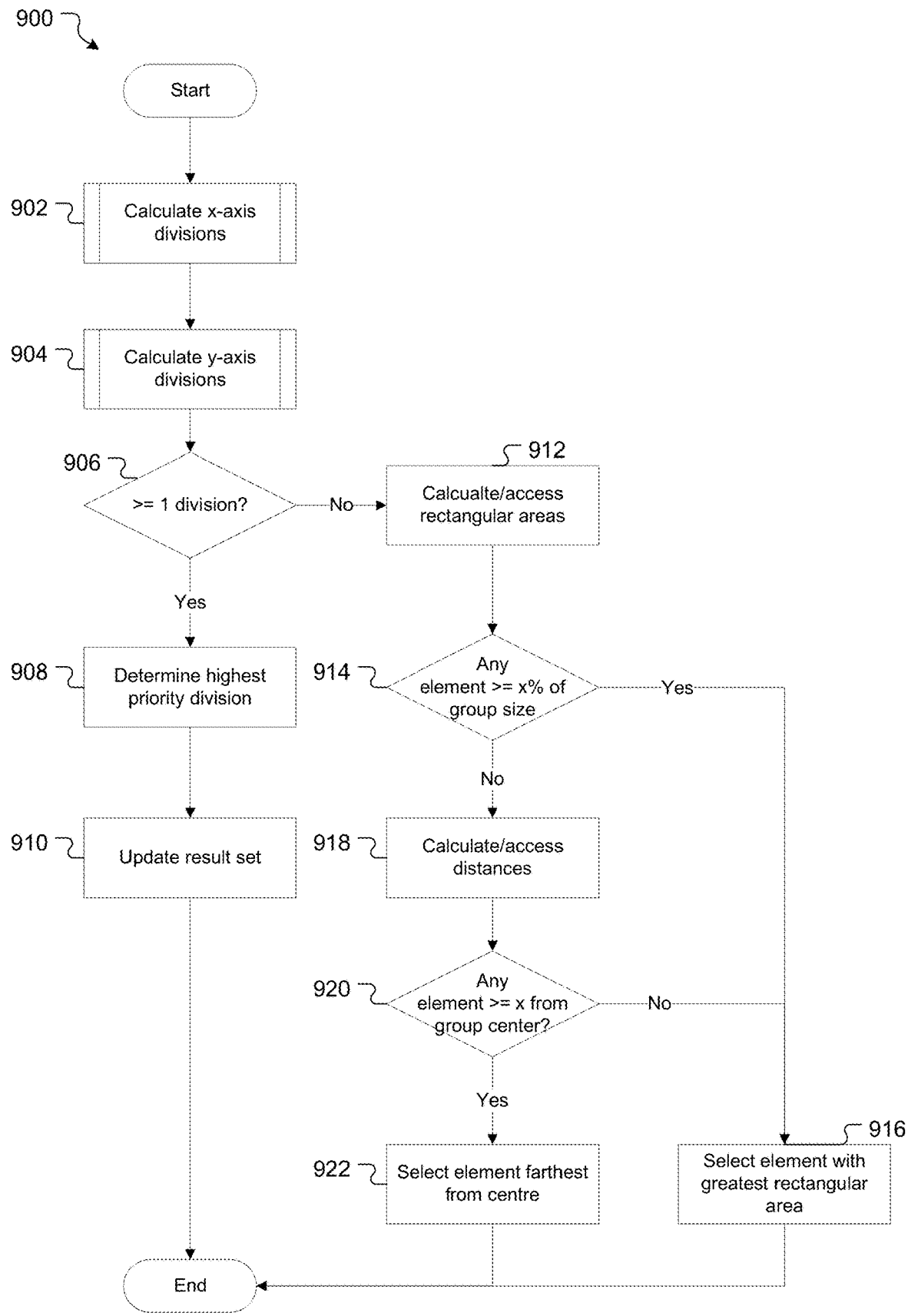
FIG. 9 is a flowchart depicting operations involved in splitting a group of elements.

At 510, the EGP 106 splits the group selected at 408. Generally speaking, this involves determining one or more elements from the selected group to be removed from the selected group and put into a new group. Example processing for splitting a group of elements is described with reference to FIG. 9 below.

Together, the processing at 508 and 510 results in an additional set of groups being added to the result set. To provide an example, consider a result set with current state as follows:

```
{
    Element001: [0, 0],
    Element002: [0, 0],
    Element003: [0, 1],
    Element004: [0, 1]
}
```

At 508, the EGP 106 determines the group with the least cohesion in the most recent set of groupings (i.e. the $2^{nd}$ set of groupings) to be the group with the identifier '1' (which includes elements 003 and 004). At 510, the EGP 106 determines that element 004 is (in this case) to maintain group identifier 1 while element 003 is to go into a new group (with new group identifier 2). This results in an updated result set as follows:

```
{
    Element001: [0, 0, 0],
    Element002: [0, 0, 0],
    Element003: [0, 1, 2],
    Element004: [0, 1, 1]
}
```

As can be seen, the updated result set defines a new set of groups (defined by array elements with index 2). In the new set of groups, the membership of group 0 (which was not split) remains the same: elements 001 and 002. The membership of group 1, however, has been changed, with element 003 assigned to a new group (group 2) and element 004 remaining in its previous group (group 1).

At 512, the EGP 106 determines if a further set of groups needs to be calculated. In the present implementation, process 500 continues until a set of groups is created in which each element has been assigned to its own separate group.

The EGP 106 can be configured to determine if a further potential set of groups should be calculated in various ways. For example, the EGP 106 can check if the number of elements in each array of the result set is the same as the number of elements accessed at 502. If so, each element in question is in its own group and there is no need to calculate any further set(s) of groups. In this case, process 500 and the determination of possible element groupings is complete—the possible groupings being the sets of groups defined by the result set.

If, at 512, one or more further sets of groups does need to be calculated (e.g. the number of elements in each result set array is less than the number of elements accessed at 502) processing returns to 508.

Process 500 described above involves (at 508) the EGP 106 selecting a particular group of elements to split.

At 508 above, the EGP 106 selects the group of elements to split from the last set of groups to be calculated. The last set of groups calculated will be the set of groups defined by the current final elements of the result set arrays.

In the first processing loop for process 500, the result set arrays (as initialised at 406) all have a single element which, therefore, is the final element. Furthermore, in the first processing loop the values of the final elements of the arrays are all 0, indicating that all elements are members of a single group, group 0.

In downstream processing loops, the result set arrays will have been populated with further values.

A process 600 for determining a group to split will be described with reference to FIG. 6.

At 602, the EGP 106 determines if the current set of groups being processed only defines a single group having multiple elements. If so, processing proceeds to 604 where the EGP 106 selects the single group with multiple elements to split (as any other groups have a single element and cannot be split further).

This will always be the case for the first processing loop where all elements are assigned to a single group (and, therefore, there is only one group with multiple elements). Another example of this can be seen in the following partially populated result set:

{
    Element001: [0, 0, 0],
    Element002: [0, 0, 0],
    Element003: [0, 1, 2],
    Element004: [0, 1, 1]
}

In this case only group 0 has multiple elements so it is selected for splitting.

If, at 602, the current set of groups defines more than one group with multiple elements, processing proceeds to 606.

At 606, the EGP 106 accesses any group cohesion metrics that have already been calculated and saved for any of the groups with more than one element. As described below, this involves determining whether a group cohesion metric associated with all elements of a given group has been saved.

At 608, the EGP 106 calculates new group cohesion metrics for each group that has more than one element and for which a cohesion metric has not already been calculated (and accessed at 606).

Calculation of a group cohesion metric for a given group of elements is described below with reference to FIGS. 7 and 8.

At 610, the EGP 106 saves any group cohesion metrics calculated at 608. In this case, a given group cohesion metric is associated with the list of elements of the group to which the group cohesion metric relates. For example, if a group cohesion metric of x is calculated for group 001, and group 001 has elements E001, E002 and E003, the group cohesion metric x is associated with elements [E001, E002, and E003] rather than the group identifier. This is because group memberships can change in each different set of groups that is calculated and added to the result set (and, therefore, associating the cohesion metric with a group identifier will not suffice).

At 612, the EGP 106 determines which group to split based on the group cohesion metrics for the groups in the set that have more than one element. In particular, the EGP 106 determines to split the group with the group cohesion metric indicating the least cohesion between the elements. Where group cohesion metrics are calculated as described below, the higher the calculated value of the group cohesion metric the less cohesive the group is considered to be.

If, at 612, multiple groups have the same least group cohesion, the EGP 106 can be configured to select one of the groups having the equal least cohesion metric in various ways—e.g. by splitting the first such group (e.g. the group with the lowest group identifier), randomly selecting a group, or otherwise selecting a group.

Process 600 then ends.

Processes 400 (the overall process for automatically grouping elements) involves calculating a set cohesion metric at 412. In the particular example provided, calculating set cohesion metric involves calculating the coherence of the groups in a given set of groups (G).

Process 600 (determining a group of elements to split) involves calculating a group cohesion metric at 608.

Figure 7:
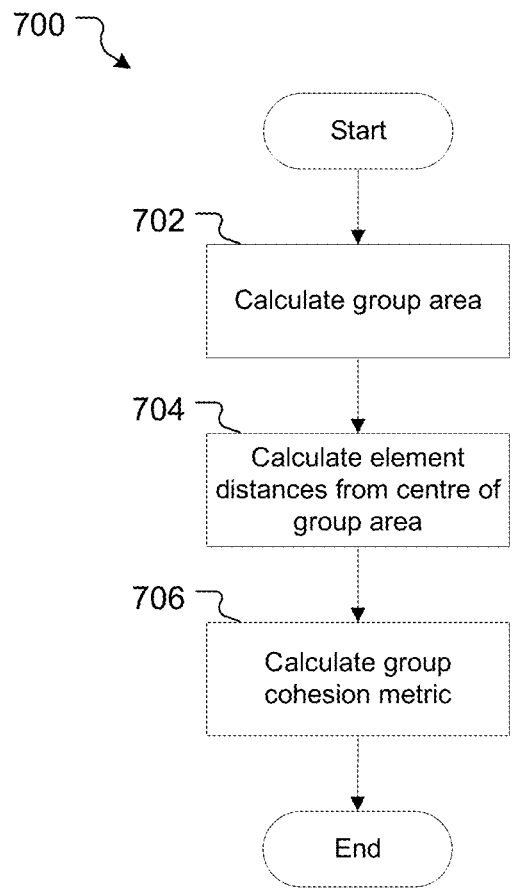
FIG. 7 is a flowchart depicting operations involved in calculating a cohesion metric for a group of elements.
Figure 8:
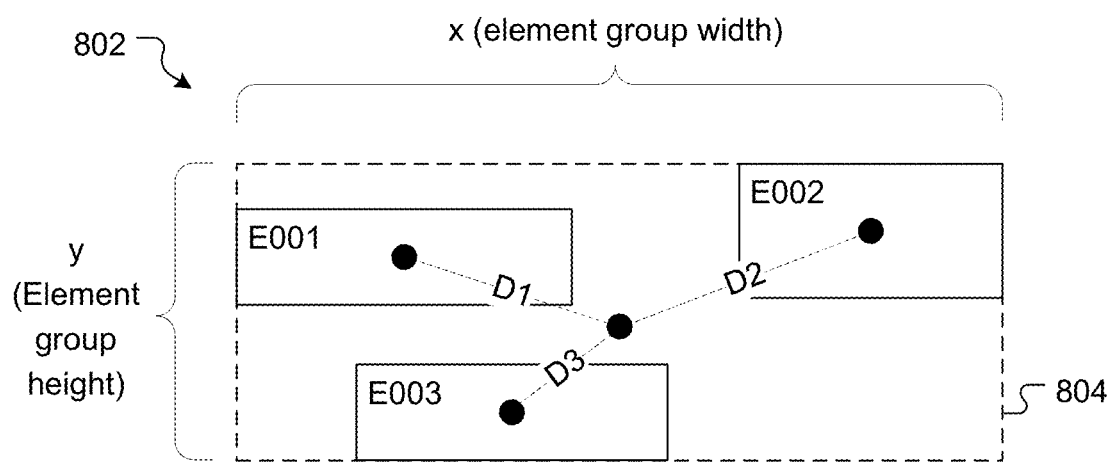
FIG. 8 depicts a group of elements with annotations to further describe the calculation of a cohesion metric for a group of elements.

Referring to FIGS. 7 and 8, a process 700 for calculating a cohesion metric for a particular group of elements will be described. Alternative processes for calculating group cohesion can, however, be used.

The processing described allows for alternative divisions to be identified (and/or alternative division priorities to be determined).

In process 700, a given element may be a single element (e.g. a page element that is not a member of a group or a page element representing an explicit group of elements). This will be the case where cohesion metrics are calculated at 608.

A given element of a group for process 700 may, however, itself be a group of elements. This will be the case when calculating the cohesions of one or more of the sets of groups at 412. For example, one of the examples described above involves calculating the cohesion of the following set of groups;

[[001, 002], [003, 004]]

In this group: element 1 is itself a group of elements (elements 001 and 002) and element 2 is also a group of elements (elements 003 and 004).

In the present example, the group cohesion metric for a group of elements is calculated in the same way regardless of whether a given element of the group is a singular element or is itself a group of elements. Alternative processes could, however, be adopted.

A group cohesion metric for a given group of elements can be calculated in various ways. In the present embodiment, the EGP 106 calculates a spatially-based group cohesion metric based on a spatial spread of the group's elements. A spatially-based group cohesion metric can also be calculated in various ways, but in the present embodiment the EGP 106 takes into account the number of elements in the group, the group area (i.e. the area occupied by the elements of the group), and the element distances from the centre of the group.

FIG. 7 depicts operations of an example group cohesion metric calculation process 700. These operations are described in conjunction with FIG. 8, which shows a group 802 of three elements (E001, E002, and E003) with various annotations to assist with explanation of the cohesion metric calculation.

At 702, the EGP 106 calculates a group area for the group in question. In the present example, the group area is a rectangular area defined by the elements in the group. In FIG. 8, the group area is indicated by broken line 804. The group area can be calculating by multiplying the group area's width by the group area's height.

The group area's width can, in turn, be calculated by subtracting the minimum (or equal minimum) x coordinate of all elements in the group from the maximum (or equal maximum) x coordinate of all elements in the group. Similarly, the group area's height can be calculated by subtracting the minimum (or equal minimum) y coordinate of all elements in the group from the maximum (or equal maximum) y coordinate of all elements in the group.

For group 802, therefore: the group areas is:

Group area width=$x$=($E$002 max-$x$–$E$001 min-$x$)

Group area height=$y$=($E$003 max-$y$–$E$002 min-$y$)

Group area=($x$*$y$)

It will be recalled that minimum and maximum x and y coordinates for individual elements are calculated and stored at 504.

If a given element of the group is itself a group of elements, further work may need to be performed to calculate that particular element's min/max x/y. For an element that is a group of elements: the min-x is the minimum (or equal minimum) min-x value of all elements in the group; the max-x is the maximum (or equal maximum) max-x value of all elements in the group; the min-y is the minimum (or equal minimum) min-y value of all elements in the group; the max-y is the maximum (or equal maximum) max-y value of all elements in the group.

At 704, the EGP 106 calculates, for each element in the group, an element distance from the centre of the group area To calculate a given element's distance from the centre of the group area, (x,y) coordinates for the centre of the group area and the centre of each element are initially calculated.

The (x,y) centre of the group area can be calculated as ((min x coordinate of all elements in group+(width of group area/2)), ((min y coordinate of all elements in group+(height of group area/2)). The (x,y) centre or an element that is itself a group of elements can be calculated in the same way.

The (x,y) centre of a given element that is a singular element can be calculated as ((min x coordinate of element+ (width of element/2)), ((min y coordinate of element+ (height of element/2)).

Once the group area centre and element centres have been calculated, a given element's distance from the centre of the area occupied by all elements in the group (e.g. distances D1, D2, or D3 in FIG. 8) can be calculated using Pythagoras theorem—i.e.:

Element's distance=Square root ((centre $x$ coordinate of element–centre $x$ coordinate of area)$^2$+(centre $y$ coordinate of element–centre $y$ coordinate of area)$^2$)

At 706, the group cohesion metric for the group of elements is calculated according to the following formula:

Cohesion=(number of elements in group)*(group area)*(sum of distances between each element and the centre of group area)

In the example of FIG. 8, therefore, the group cohesion metric is:

(3)*($x$*$y$)*($D$1+$D$2+$D$3)

Process 500 described above involves (at 510), the EGP 106 splitting a selected (target) group of elements. A process 900 for splitting a group of elements will be described with reference to FIG. 9, however alternative processes for splitting a group of elements can be used.

Generally speaking, process 900 involves determining whether any potential divisions exist between the elements in the target group. If so, the highest priority division is used to split the group with elements on one side of the division remaining in the original group and elements on the other side of the division being assigned to a new group. If no potential division points exist, a single element of the target group is selected and assigned to a new group.

At 902, the EGP 106 calculates any x-axis divisions between the elements in the group in question.

At 904, the EGP 106 calculates any y-axis divisions between the elements in the target group.

Figure 10:
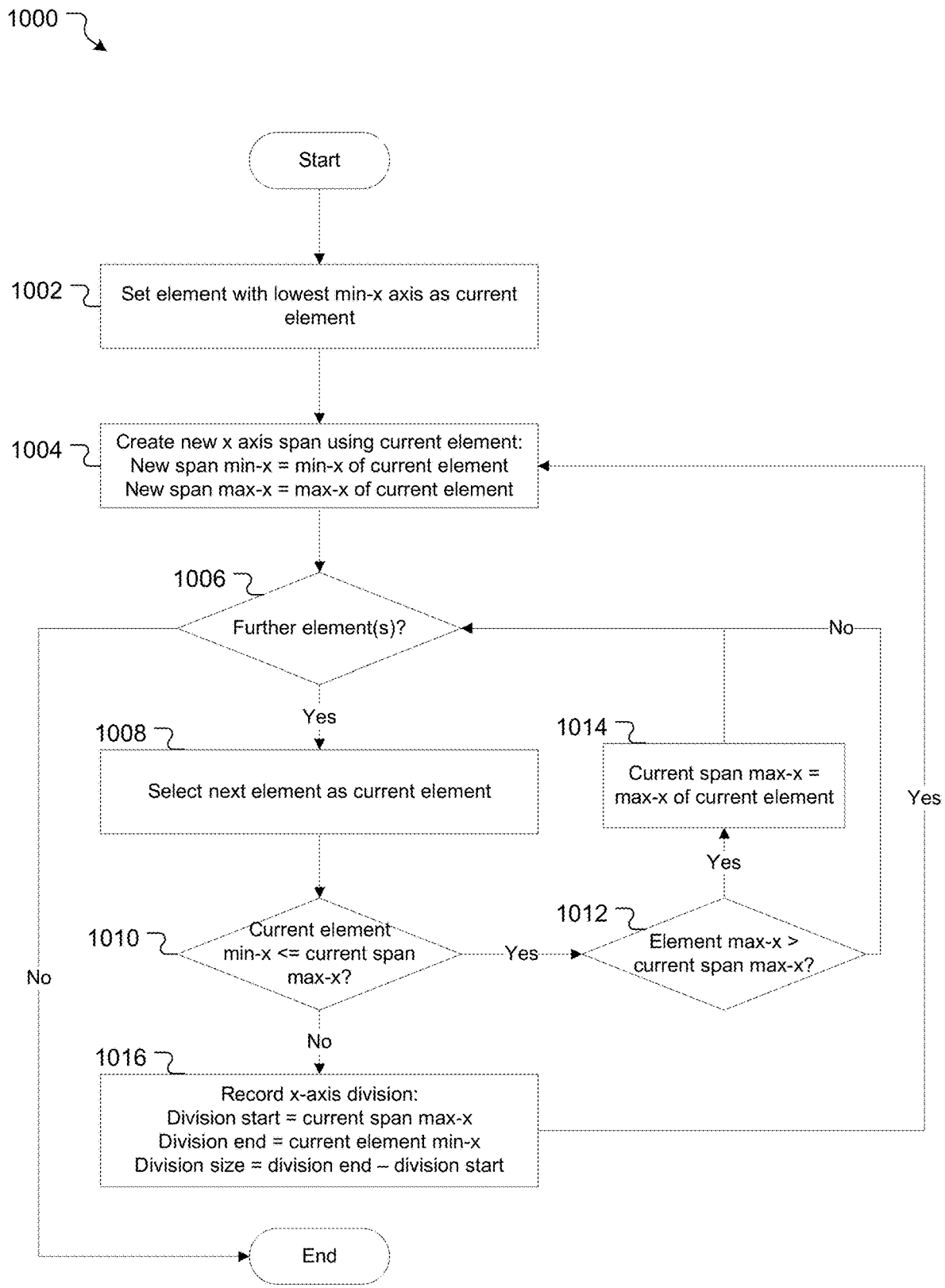
FIG. 10 is a flowchart depicting operations involved in determining any divisions in a group of elements.

Calculating divisions between elements in a group is described further below with reference to FIGS. 10 and 11. Calculation of x-axis and y-axis divisions can be performed in an order, or in parallel.

Following 902 and 904, the EGP 106 has calculated a set of 0 or more divisions between the elements in the target group.

At 906, the EGP 106 determines if at least one division has been calculated. If so processing proceeds to 908, if not processing proceeds to 912.

At 908, the EGP determines the highest priority division. With reference to division calculation process 1000 described below, the highest priority division is the x-axis or y-axis division that has the greatest size/width (e.g. division 1108 in element group 1100 of FIG. 11). In the present embodiment, if multiple divisions have the same greatest size, the EGP 908 can be configured to determine the division in various ways—for example by selecting the a division that is closest to an x-centre or y-centre of the group, selecting a division that creates the most even split of elements, selecting the first highest priority division, randomly selecting one of the highest priority divisions, or otherwise selecting one of the highest priority divisions.

At 910, the EGP 106 updates the result set to include a new set of groups. The new set of groups is based on a split using the division identified at 908. In particular, the one or more elements on one side of the division are identified as new group elements (i.e. elements that will be placed in a new group), and the remaining element(s) (on the other side of the division) will remain in the target group.

To generate the new set of groups in the result set, a new value is added to each element's array. Groups other than the target group remain the same—i.e. elements that are not in the target group retain the same group identifier they had in previously created set of groups). Elements in the target group that were not identified as new group elements also remain in the same group—i.e. the target group elements also remain the same with the exception that the new group elements are removed from it. A new group is created (i.e. a new group identifier is created) and the new group elements are assigned to that new group.

To illustrate this, consider again the partial result set:

{
    Element001: [0, 0, 0],
    Element002: [0, 0, 0],
    Element003: [0, 1, 2],
    Element004: [0, 1, 1]
}

In this case group 0 is the target group being split, the split resulting in elements 001 and 002 being separated. This results in the following result set:

{
    Element001: [0, 0, 0, 0],
    Element002: [0, 0, 0, 3],
    Element003: [0, 1, 2, 2],
    Element004: [0, 1, 1, 1]
}

As can be seen, in the new set of groups that has been added (defined by the 4th element of the arrays): the elements 003 and 004 groups have not changed (as these groups were not being split); element 001 has remained in group 0; element 002 has been assigned to a new group 3.

As a further illustration, for the group of elements depicted in FIG. 11, division 1108 has the largest size and, therefore, is selected as the highest priority division. Accordingly, splitting group 1102 involves assigning elements E1, E2, and E3 to one group (these elements falling to the left of division 1108) and assigning elements E4 and E5 to another group (these elements falling to the right of division 1108).

More generally. Where a division is an x-axis division: any group elements with a min-x value less than the division start will be assigned to one group; any group elements with a min-x value greater than the division start will be assigned to another group. Where a division is a y-axis division: any group elements with a min-y value less than the division start will be assigned to one group; any group elements with a min-y value greater than the division start will be assigned to another group.

Following 910, the group splitting process is complete.

At 912, the EGP 106 has determined that no divisions were calculated at 902 or 904. In this case the EGP 106 identifies a single element to be removed from the group and assigned to a new group. Generally speaking, the EGP 106 is configured to try and identify the single element of the group that is most likely to be impeding the identification of division points. Various checks can be performed to achieve this.

In the present embodiment, the EGP 106 is configured to initially determine whether any element in the group meets a defined area criteria and, if so, selects an element based on area. If not, the EGP 106 determines whether any element meets a defined distance criteria and, if so, selects an element based on its distance from the centre of the group that the element is a part of. If no elements meet either the area criteria or distance criteria, the EGP 106 selects an element with the largest area to remove from the group.

Accordingly, in the present example, at 912 the EGP 106 calculates (or, if already calculated and stored, accesses) the rectangular areas of each element in the group and of the group itself. Calculation of the rectangular area occupied by an element can be performed by multiplying the element's width (max-x−min-x) by its height (max-y−min-y). Calculation of the rectangular area of the group itself is described above at 702.

At 914, the EGP 106 determines if one or more elements of the group meet the area criteria: specifically, if one or more elements have an area that is greater than or equal to defined percentage of the total group area. The defined percentage may, for example, be 90% (in which case the EGP 106 determines if any elements have an area that is at least 90% of the group area).

If, at 914, there are one or more elements with an area of at least the defined percentage, processing proceeds to 916. At 916, the EGP 106 selects the element with the greatest area. If more than one element shares the same greatest area the EGP 106 can select any one of those elements.

In certain embodiments, 914 may be performed as two separate determinations: initially a determination as to whether any element occupies the entire group area (if so that element or one such element is selected) followed by a determination as to whether any element has an area that is at least the defined percentage of the total group area.

If, at 914, no element has an area of at least the defined percentage, processing continues to 918. At 918, the EGP 106 calculates (or, if already calculated and stored, accesses) the each element's distance from the centre of the group and a group hypotenuse length. Calculation of a given element's distance from the centre of the group is described above at 704. The group hypotenuse length can be calculated using Pythagoras theorem (e.g. square root ((group width)$^2$+ (group height)$^2$)).

At 920, the EGP 106 determines if one or more elements of the group meet the defined distance criteria. In this case, the distance criteria is that an element (i.e. an element's centre) is at least x away from the centre of the group. X in this case is a percentage of the group's hypotenuse—e.g. 35% of the group's hypotenuse (though alternative thresholds could be used).

If, at 920, there are one or more elements that meet the distance criteria, processing proceeds to 922. At 922, the EGP 106 selects the element that is the farthest from the centre of the group. If more than one element shares the same farthest distance from the centre of the group the EGP 106 can select any one of those elements.

If, at 920, no element meet the distance criteria, processing continues to 916 where the element with the greatest rectangular area is selected.

At 916, the EGP 106 updates the result set to include a new set of groups. For the new set of groups in the result set, the element selected at 914 is assigned to a new group and all other elements remain in the groups they were in for the previously created set of groups.

At 902 above, the EGP 106 calculates any x-axis divisions between elements in a group. In the present embodiments, x-axis divisions are x-axis bands of empty space between elements. Similarly, at 904, the EGP 106 calculates any y-axis divisions between elements in a group (y-axis divisions in the present embodiments being y-axis bands of empty space between elements).

Calculating x- and y-axis divisions can be performed in various ways.

An example division calculation process 1000 for a calculating x-axis divisions will be described with reference to FIG. 10. This process is then adapted to calculate y-axis divisions. Following discussion of the division calculation process, a walk-through example of process 1000 is described with reference to FIGS. 11A to 11D.

At 1002, the EGP 106 sets the current element to be processed as the element in the group that has the lowest (or equal lowest) min-x value. This can be performed using the data calculated and stored at 504.

At 1004, the EGP 106 creates a new x-axis element span. An x-axis element span consists of one or more elements that overlap on the x-axis. An element span has a span min-x value (which, at 1004, is set to the min-x value of the current element) and a span max-x value (which, at 1004, is set to the max-x value of the current element).

At 1006, the EGP 106 determines whether any elements in the group have not yet been processed. If so, processing proceeds to 1008. If not, calculation of x-axis divisions is complete (noting that in some cases no x-axis divisions may be identified).

At 1008, the EGP 106 selects the next element as the current element. In this example, elements are processed in order of minimum min-x to maximum min-x—accordingly, the next element selected for processing is the element with the next lowest (or next equal lowest) min-x value.

At 1010, the EGP 106 determines if the current element's min-x value is less than or equal to the current span's max-x value. If so, processing proceeds to 1012. If not, processing proceeds to 1016.

At 1012, the current element's min-x value is less than the current span's max-x value. In this case, the EGP 106 determines whether the current element's max-x value is greater than the current span's max-x value.

If the current element's max-x value is not greater than the current span's max-x value, processing returns to 1006 to determine if further elements require processing.

If the current element's max-x value is greater than the current span's max-x value, processing proceeds to 1014 where the EGP 106 sets the current span's max-x value to the max-x value of the current element. Processing then continues to 1006 to determine if further elements require processing.

At 1016, the current element's min-x value is greater than the current span's max-x value. This indicates a band of empty space exists between elements on the x-axis. In this case, the EGP 106 records a new x-axis division. The x-axis division has a division start equal to the current span's max-x value and a division end equal to the current element's min-x value. A division size can also be calculated as the division end—the division start. Processing then returns to 1004 to create a new span using the current element.

If the design tool permits elements to extend off the page (or off an area of the page that will ultimately be rendered/visible), any off-page element portions are ignored. This can be achieved in various ways.

Variations to process 1000 are possible. For example instead of working through elements in minimum min-x to maximum min-x order this could be reversed (with appropriate changes to the determinations made at various points in the process).

In the present embodiment, y-axis divisions are calculated in the same manner as x-axis divisions. Accordingly, process 1000 is repeated, with appropriate adaptations for the y-axis. i.e.:

At 1002, the EGP 106 sets the current element to be processed as the element with the lowest (or equal lowest) min-y value.

At 1004, the EGP 106 creates a new y-axis element span with span min-y=current element min-y and span max-y=current element max-y.

At 1008, the next element selected by the EGP 106 is the element with the next lowest (or equal next lowest) min-y value.

At 1010, the EGP 106 determines if the current element's min-y value is less than or equal to the current span's max-y value.

At 1012, the EGP 106 determines whether the current element's max-y value is greater than the current span's max-y value.

At 1014, the EGP 106 sets the current span's max-y value to the max-y value of the current element.

At 1016, the EGP 106 records a new y-axis division: y-axis division start=current span's max-y; y-axis division end equals current element's min-y value.

Figure 11A:
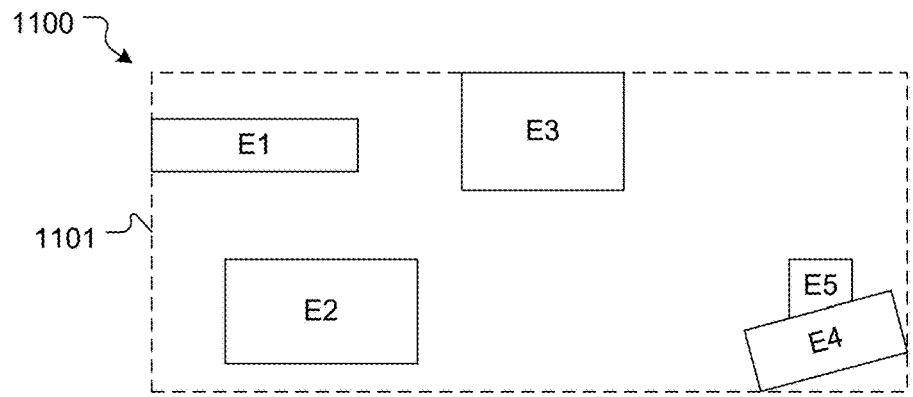
FIGS. 11A to 11D depict a group of elements with annotations to further describe the determination of any divisions in a group of elements.

To illustrate the division calculation process 1000 described above, consider the group of elements 1100 depicted in FIG. 11A. Element group 110 includes five elements (E1, E2, E3, E4, and E5).

In FIGS. 11A, B, and C a broken line rectangle 1101 has been drawn around the elements. This rectangle is not part of the element group (its coordinates can be determined by reference to the minimum min-x, maximum max-x, minimum min-y, and maximum max-y values of the elements in the group).

Figures 11B, 11C:
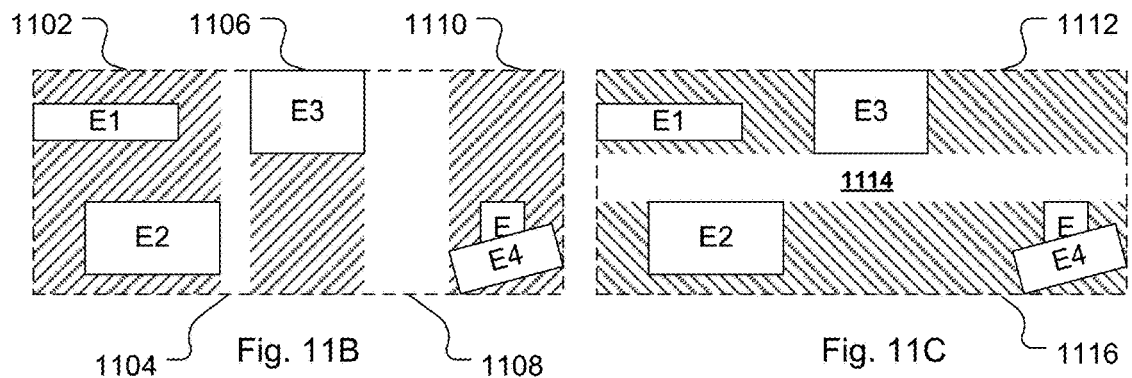

FIG. 11B illustrates x-axis spans 1102 (spanning elements E1 and E2), 1106 (spanning element E3), and 1110 (spanning elements E4 and E5). FIG. 11B also illustrates two x-axis divisions: division 1104 (between elements E2 and E3) and division 1108 (between elements E3 and E4).

FIG. 11C illustrates y-axis spans 1112 (spanning elements E1 and E3) and 1116 (spanning elements E2, E4, and E5). FIG. 11C also illustrates a y-axis division: division 1114 (between elements E3 and E2/E5).

Figure 11D:
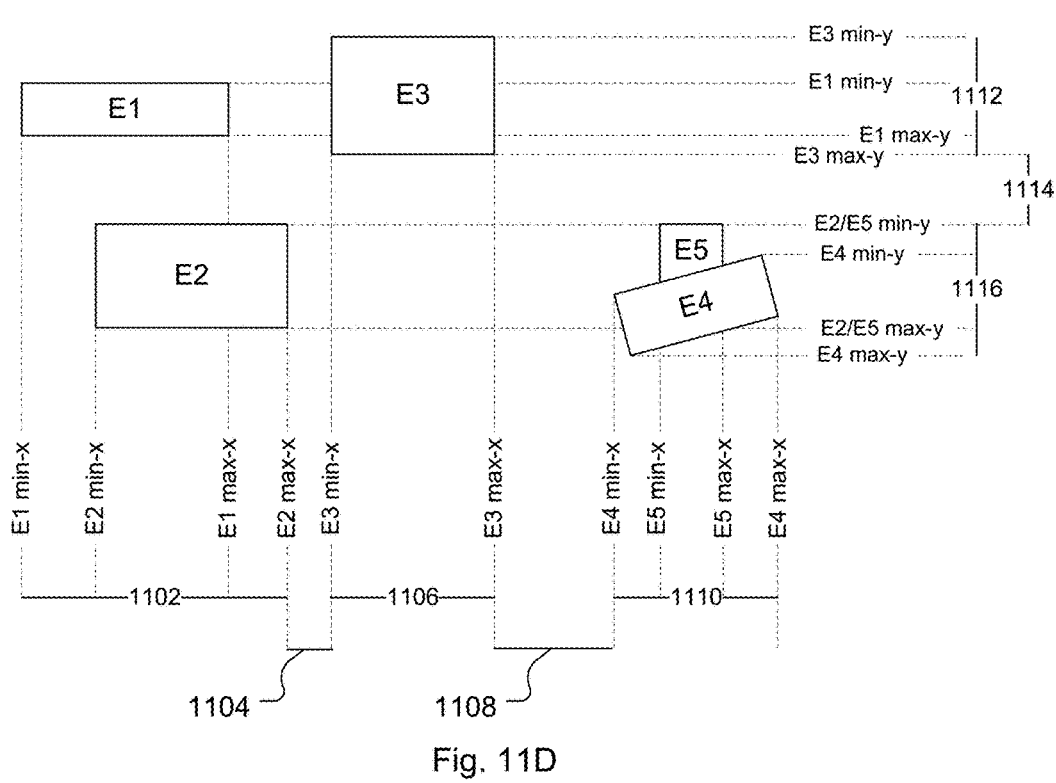

To assist with explanation, FIG. 11D provides broken lines indicating min-x, max-x, min-y, and max-y coordinates for each element (as calculated at 504).

Working through process 1000 to determine x-axis divisions.

At 1002, element E1 is set as the current element. At 1004 a new span 1102 is created: span min-x=E1 min-x, span max-x=E1 max-x. At 1006, there are further elements to process. At 1008 element E2 is set as the current element. At 1010, E2's min-x is less than the current span max-x (which at this stage is the max-x of element E1). At 1012, E2's max-x is greater than the current span's max-x (E1's max-x). At 1014 the current span's max-x is set to E2's max-x current span min-x. Processing then returns to 1006.

At 1006, there are further elements to process. At 1008 element E3 is selected as the current element. At 1010, element E3's min-x is greater than the current span's max-x (which is currently E2's max-x). At 1016 an x-axis division 1104 is recorded: division start=current span's max-x (E2's max-x), division end=current element's (E3) min-x. Processing then returns to 1004.

At 1004, a new span 1106 is created using the current element (E3): new span min-x=E3 min-x, new span max-x=E3 max-x). At 1006 there are further elements to process.

At 1008 E4 is selected as the current element. At 1010, element E4's min-x is greater than the current span's max-x (which is currently E3's max-x). At 1016 an x-axis division 1108 is recorded: division start=current span's max-x (E3's max-x), division end=current element's (E4) min-x. Processing then returns to 1004.

At 1004, a new span 1110 is created using the current element (E4): new span min-x=E4 min-x, new span max-x=E4 max-x. At 1006 there are further elements to be processed. At 1008 E5 is selected as the current element. At 1010, E5's min-x is less than the current span max-x (which at this stage is the max-x of element E4). At 1012, E2's max-x is less than the current span's max-x (E4's max-x). Processing returns to 1006.

At 1006, there are no further elements so calculation of x-axis divisions ends.

A similar process occurs to determine any y-axis divisions This process identifies a first y-axis span 1112 (which ultimately has span min-y=E3 min-y and span max-y=E3 max-y), a first y-axis division 1114 (division start=E3 max-y, division end=E2/E5 min-y), and a second y-axis span 1116 (which ultimately has span min-y=E5 min-y and span max-y=E4 max-y).

Accordingly, for the group of elements of FIG. 11, calculating x-axis and y-axis divisions results in the following spans:

| Span ID | Span axis | Span elements | Span min coord. | Span max coord. |
|---|---|---|---|---|
| 1102 | x | [E1, E2] | E1 min-x | E2 max-x |
| 1106 | x | [E3] | E3 min-x | E3 max-x |
| 1110 | x | [E4, E5] | E4 min-x | E4 max-x |
| 1112 | y | [E3, E1] | E3 min-y | E3 max-y |
| 1116 | y | [E2, E5, E4] | E2 min-y | E4 max-y |

And the following divisions:

| Division ID | Division axis | Division start | Division end | Division size |
|---|---|---|---|---|
| 1104 | x | E2 max-x | E3 min-x | E3 min-x – E2 max-x |
| 1108 | x | E3 max-x | E4 min-x | E4 min-x – E3 max-x |
| 1114 | y | E3 max-y | E2 min-y | E2 min-y – E3 max-y |

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically grouping a plurality of design elements on a page, the method comprising:
receiving a request to automatically group the design elements;
generating two or more sets of groups, each set of groups including one or more groups into which all of the plurality of design elements are grouped, each group including one or more of the design elements;
calculating set cohesion metrics for at least two of the sets of groups, the set cohesion metric calculated for a given set of groups being based on spatial positions of the one or more groups that are included in the given set of groups and providing a measure of how well the given set of groups has grouped the design elements on the page;
determining, based on the set cohesion metrics, a final set of groups; and
grouping the design elements according to the one or more groups defined by the final set of groups:
wherein generating the two or more sets of groups comprises:
generating an initial set of groups, the initial set of groups comprising a single group including all design elements, and
generating an additional set of groups by:
analysing an existing set of groups to determine a target group, the target group being a group in the existing set of groups that includes at least two of the design elements;
analysing the target group to determine one or more new group design elements; and
generating the additional set of groups to include:
one or more non-target groups, the one or more non-target groups being groups from the existing set of groups that are not the target group;
a modified target group, the modified target group being the target group from the existing set of groups with the one or more new group design elements removed therefrom; and
a new group including the one or more new group design elements.

2. The computer implemented method of claim 1, wherein analysing the existing set of groups to determine the target group comprises:
calculating a group cohesion metric for each group in the existing set of groups; and
determining a target group based on the calculated group cohesion metrics.

3. The computer implemented method of claim 2, the group cohesion metric for a given group is calculated based on a spatial spread of design elements in the given group.

4. The computer implemented method of claim 3, wherein calculating a group cohesion metric for a given group comprises:

calculating an area occupied by the given group;
calculating, for each design element in the given group, an element distance, the element distance of a given design element being a distance between a centre of the given design element and a centre of the given group; and
calculating the group cohesion metric for the given group based on the area occupied by the given group and the element distances of all design elements in the given group.

5. The computer implemented method of claim 1, wherein analysing the target group to determine one or more new group design elements comprises:
determining whether one or more divisions exist between design elements in the target group; and
in response to determining one or more divisions exist:
determining a highest priority division; and
determining the one or more new group design elements to be the design elements on one side of the highest priority division.

6. The computer implemented method of claim 5, wherein determining whether one or more divisions exist between the design elements in the target group comprises:
determining whether any x-axis divisions exist, an x-axis division being an x-axis band within the target group that is not occupied by any design elements; and
determining whether any y-axis divisions exist, a y-axis division being an y-axis band within the target group that is not occupied by any design elements.

7. The computer implemented method of claim 5, wherein determining a highest priority division comprises determining a division with a maximum width.

8. The computer implemented method of claim 5, wherein in response to determining that no divisions exist between the two or more design elements in the target group, the method further comprises selecting a single design element in the target group to be the new group design element.

9. The computer implemented method of claim 8, wherein selecting the single design element in the target group to be the new group design element comprises:
determining if one or more design elements in the target group satisfies an area criteria, the area criteria being that an element occupies an area that is at least a defined percentage of a total area occupied by the target group; and
in response to determining that one or more design elements in the target group satisfies the area criteria, selecting a design element with a maximum area as the single design element.

10. The computer implemented method of claim 9, wherein in response to determining that no design elements in the target group satisfies the area criteria, the method further comprises:
determining if one or more design elements in the target group satisfies a distance criteria, the distance criteria being that a design element is at least a defined distance from a centre of the target group; and
in response to determining that one or more design elements in the target group satisfies the distance criteria, selecting a design element with a maximum distance from the centre of the target group as the single design element.

11. A computer processing system comprising:
at least one computer processing device;
a communication interface; and
a non-transitory computer-readable medium, having stored thereon, instructions, which when executed by the at least one computer processing device, cause the at least one computer processing device to perform operations to:
receive via the communication interface a request to automatically group a plurality of design element on a page;
generate two or more sets of groups, each set of groups including one or more groups into which all of the plurality of design elements are grouped, each group including one or more of the design elements;
calculate set cohesion metrics for at least two of the sets of groups, the set cohesion metric calculated for a given set of groups being based on spatial positions of the one or more groups that are included in the given set of groups and providing a measure of how well the given set of groups has grouped the design elements on the page;
determine, based on the set cohesion metrics, a final set of groups; and
group the design elements according to the one or more groups defined by the final set of groups:
wherein generating the two or more sets of groups comprises:
generating an initial set of groups, the initial set of groups comprising a single group including all design elements, and
generating an additional set of groups by:
analysing an existing set of groups to determine a target group, the target group being a group in the existing set of groups that includes at least two of the design elements;
analysing the target group to determine one or more new group design elements; and
generating the additional set of groups to include:
one or more non-target groups, the one or more non-target groups being groups from the existing set of groups that are not the target group;
a modified target group, the modified target group being the target group from the existing set of groups with the one or more new group design elements removed therefrom; and
a new group including the one or more new group design elements.

12. The computer processing system of claim 11, wherein analysing the existing set of groups to determine the target group comprises:
calculating a group cohesion metric for each group in the existing set of groups; and
determining a target group based on the calculated group cohesion metrics.

13. The computer processing system of claim 12, wherein calculating a group cohesion metric for a given group comprises:
calculating an area occupied by the given group;
calculating, for each design element in the given group, an element distance, the element distance of a given design element being a distance between a centre of the given design element and a centre of the given group; and
calculating the group cohesion metric for the given group based on the area occupied by the given group and the element distances of all design elements in the given group.

14. The computer processing system of claim 11, wherein analysing the target group to determine one or more new group design elements comprises:

determining whether one or more divisions exist between design elements in the target group; and in response to determining one or more divisions exist:

determining a highest priority division, the highest priority division being a division with a maximum division width; and determining the one or more new group design elements to be the design elements on one side of the highest priority division.

15. The computer processing system of claim 14, wherein in response to determining that no divisions exist between the two or more design elements in the target group, execution of the instructions causes the processing unit to select a single design element in the target group to be the new group design element, and wherein selecting the single design element in the target group to be the new group design element comprises:

determining if one or more design elements in the target group satisfies an area criteria, the area criteria being that an element occupies an area that is at least a defined percentage of a total area occupied by the target group; and in response to determining that one or more design elements in the target group satisfies the area criteria, selecting a design element with a maximum area as the single design element.

16. The computer processing system of claim 15, wherein in response to determining that no design elements in the target group satisfies the area criteria, execution of the instructions causes the processing unit to:

determine if one or more design elements in the target group satisfies a distance criteria, the distance criteria being that a design element is at least a defined distance from a centre of the target group; and in response to determining that one or more design elements in the target group satisfies the distance criteria, select a design element with a maximum distance from the centre of the target group as the single design element.

* * * * *